US009138894B2

(12) United States Patent
Alotto

(10) Patent No.: US 9,138,894 B2
(45) Date of Patent: Sep. 22, 2015

(54) INDUSTRIAL ROBOT HAVING ELECTRONIC DRIVE DEVICES DISTRIBUTED ON THE ROBOT STRUCTURE

(71) Applicant: Comau S.p.A., Grugliasco (Torino) (IT)

(72) Inventor: Giorgio Alotto, Grugliasco (IT)

(73) Assignee: Comau S.p.A., Grugliasco (Torino) (IT)

( * ) Notice: Subject to any disclaimer, the term of this patent is extended or adjusted under 35 U.S.C. 154(b) by 247 days.

(21) Appl. No.: 14/016,632

(22) Filed: Sep. 3, 2013

(65) Prior Publication Data
US 2014/0081453 A1    Mar. 20, 2014

(30) Foreign Application Priority Data
Sep. 20, 2012   (EP) .................................... 12185131

(51) Int. Cl.
*B25J 9/18*     (2006.01)
*B25J 9/12*     (2006.01)
*B25J 9/16*     (2006.01)
*H02K 5/22*     (2006.01)
*H02K 11/00*    (2006.01)

(52) U.S. Cl.
CPC .. *B25J 9/12* (2013.01); *B25J 9/161* (2013.01); *H02K 5/225* (2013.01); *H02K 11/0078* (2013.01)

(58) Field of Classification Search
CPC .... G06F 13/102; H01B 11/20; H01B 7/0009; H01B 9/006; H04H 40/18
USPC .......... 318/568.11, 568.12, 568.15, 573, 625, 318/671
See application file for complete search history.

(56) References Cited

U.S. PATENT DOCUMENTS

| | | | | |
|---|---|---|---|---|
| 4,698,568 A | * | 10/1987 | Nishizawa et al. | 318/481 |
| 4,986,724 A | * | 1/1991 | Steinmetz et al. | 414/729 |
| 5,619,111 A | * | 4/1997 | Katagiri et al. | 318/625 |
| 5,814,960 A | * | 9/1998 | Ookura et al. | 318/568.11 |
| 6,408,710 B1 | * | 6/2002 | Kullborg et al. | 74/490.03 |
| 6,522,096 B1 | | 2/2003 | Roth | |
| 6,731,091 B2 | | 5/2004 | Hietmann et al. | |

FOREIGN PATENT DOCUMENTS

| | | |
|---|---|---|
| DE | 10-2009-056-578 A | 6/2011 |
| EP | 0 728 559 B1 | 10/1998 |
| JP | 2003-136454 A | 5/2003 |
| WO | 2008/154958 A1 | 12/2008 |

\* cited by examiner

*Primary Examiner* — Bentsu Ro
*Assistant Examiner* — Thai Dinh
(74) *Attorney, Agent, or Firm* — Young Basile Hanlon & MacFarlane P.C.

(57) ABSTRACT

In an industrial robot, the electronic drive devices for the electrical supply and control of electric motors of the robot are distributed on the robot structure, each being adjacent to the respective electric motor. The electronic drive devices are connected in series to each other and to a central processing unit. In this series connection an Ethernet line is included for communication of the electronic drive devices with the central processing unit. Thanks to this series connection, the robot harness is dramatically simplified and the operations for its replacement are consequently easier and faster. The structure of the connectors between the robot and the control unit is also greatly simplified.

5 Claims, 5 Drawing Sheets

INDUSTRIAL ROBOT HAVING ELECTRONIC DRIVE DEVICES DISTRIBUTED ON THE ROBOT STRUCTURE

TECHNICAL FIELD

The embodiments disclosed herein generally relate robot control systems for industrial robots.

BACKGROUND

In a robot control system of conventional type a control cabinet is located at a remote position from the robot structure and includes both a central control unit, which is designed to receive instructions from the user programme and to generate the movement trajectories that must be implemented by the robot motors, and the electronic drive devices of the various robot motors that receive movement instructions from the central unit, and transform them into electric current signals to be sent to the robot motors to guarantee execution of the user programme. Industrial robots of this type are, for example, illustrated in the documents EP 0 728 559 B1 and U.S Pat No. 6,731,091 B2.

In the above-identified documents, it has been already proposed to distribute the aforesaid electronic drive devices on the robot structure, each immediately adjacent to the respective electric motor. However, the solutions of this type which have been provided so far show that there occurred no understanding nor even a vague idea of all the possibilities that are offered by a control architecture with electronic drive devices distributed on the robot structure.

Furthermore, the relative complexity of existing robot wiring harness implies a considerable loss of time both at the time of the initial installation of the robot, as well as each time that the robot harness needs to be replaced. The bending and torsion deformations to which the cables are subject during the movement of the robot elements in fact imposes a relatively short life to the harness itself, with the consequent need for replacement.

A simplification of the harness of the robot would simultaneously solve both the problem of poor durability (since a simplified harness can be more easily positioned within the robot in a way that minimizes deformations), as well as the problem of complexity and length of the harness replacing operations.

SUMMARY

This disclosure relates to an industrial robot of the type comprising a robot structure and electronic means for controlling the robot structure. According to one embodiment, the robot structure comprises a plurality of robot elements movable relative to each other, and a plurality of actuating means, each for driving the movement of a respective robot element, wherein each of the actuating means associated with a respective robot element comprises at least one drive electric motor. Additionally, the electronic means comprises a central electronic control unit located at a remote position from the robot structure, and a plurality of electronic drive devices, each for the electric power supply and control of the electric motor associated with a respective robot element. The electronic drive devices are connected to the central electronic control unit, and the electronic drive devices are distributed on the robot structure, each in adjacency to the respective electric motor.

The industrial robot is adapted to take advantage of a control architecture with electronic drive devices distributed on the robot structure in order to drastically simplify the wire harness of the robot, in such a way to increase the durability of the harness and simplify the replacing operations.

In one example, the central electronic control unit is solely connected to the first of the aforesaid electronic drive devices distributed on the structure of the robot, with the other electronic drive devices being connected in series to the first electronic drive device. Furthermore, each electronic drive device is rigidly connected to the body of the respective electric motor with the interposition of an adapter plate. Finally, a connector unit is mounted on top of each electronic drive device. The unit includes a first electrical connector and a second electrical connector, for providing the series connection of each electronic drive device between the central electronic control unit and the other electronic drive devices, with the electrical connectors including connecting elements for an Ethernet line that connects the electronic drive devices together with the central control unit.

Thanks to the aforesaid characteristics, the wire harness of the robot, the connection harness between the control cabinet and the robot structure, and the electrical connectors arranged at the base of the robot structure for connection to the control cabinet are all dramatically simplified. In particular, in any part of the robot structure the wiring only includes the necessary connections between two successive electronic drive devices, in this specific case a power supply electric line, a line for control signals and an Ethernet communication line. This represents a drastic simplification compared to the known solutions, in which all the electronic devices are connected in parallel to the central control unit, so that the input wiring in the robot structure comprises a number of cables which is a multiple of that in the case of the illustrated embodiment. The Ethernet line may be a real time EtherCat or Powerlink Ethernet line, or the like.

Furthermore, the arrangement of the adapter plate between each electronic drive device and the body of the electric motor to which it is attached allows the use of standard electric motors. The adapter plate can be a separate element with respect to the body of the driving device or may be a portion incorporated within it. The adapter plate is arranged with one or more passages for the connections between the electronic drive device and the motor. It also contributes to the dissipation of some of the heat generated by the motor, thereby reducing the torque "derating" of the motor itself due to overheating.

The provision of the Ethernet line ensures the efficiency of the communication of each electronic drive device and the central control unit, despite the above-mentioned series connection.

According to a further feature, a layer of thermally insulating material may be interposed between the adapter plate and the body of the electric motor, in order to further reduce the torque "derating" of the motor due to overheating.

BRIEF DESCRIPTION OF THE DRAWINGS

Additional features and advantages will be evident from the description that follows with reference to the attached drawings, provided purely by way of non-limiting example, wherein.

DETAILED DESCRIPTION

Figure 1:
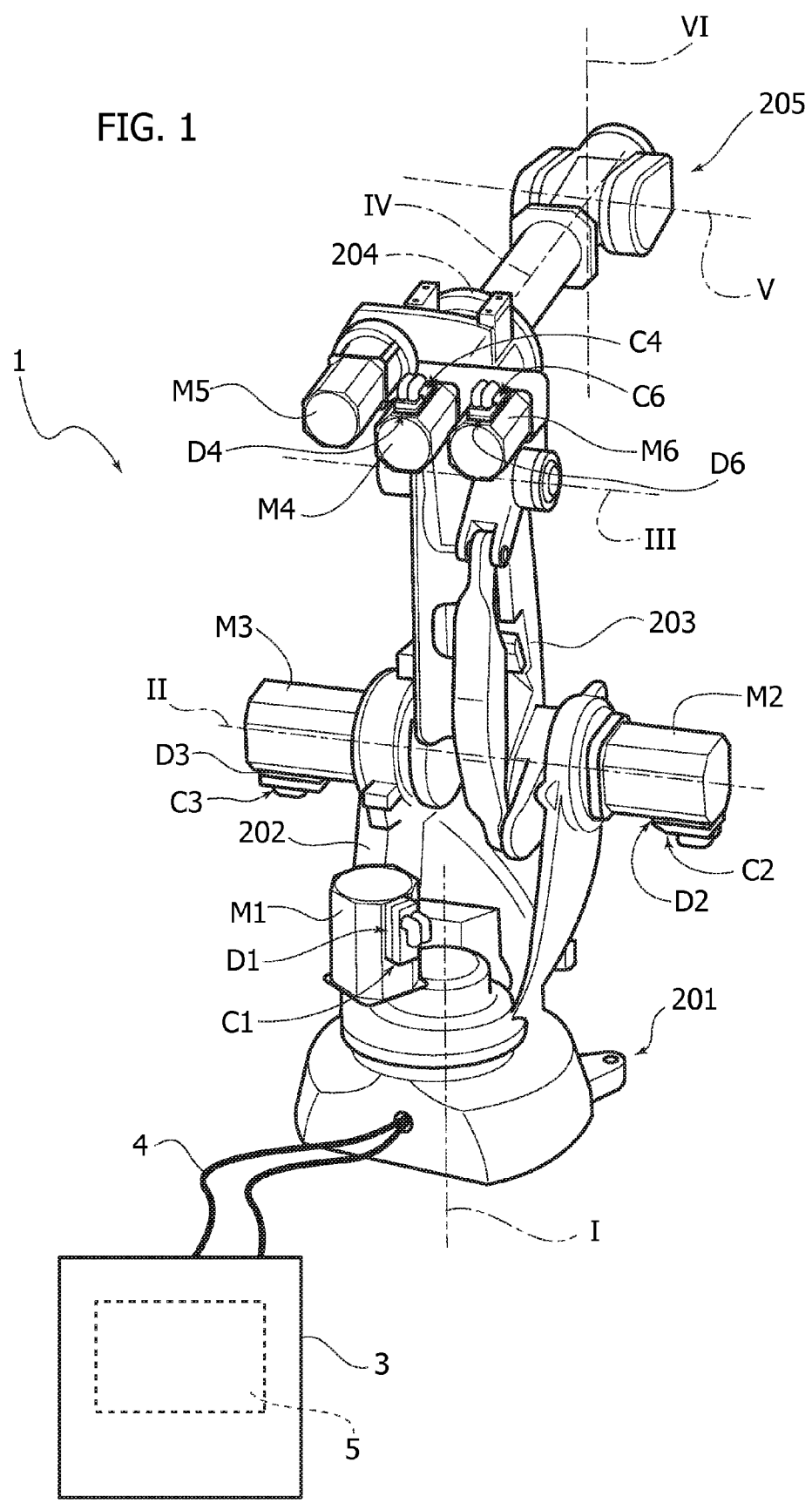
FIG. 1 is a schematic perspective view of an example of one embodiment of a robot.

With reference to FIG. 1, numeral 1 generally designates an industrial robot including a robot structure 2, and a control cabinet 3 located at a remote position from the robot structure 2 and connected thereto by means of one or more connecting cables 4. The robot structure 2 is typically that of a manipulator robot with six axes, with a base 201, a turret 202 rotatable about a vertical axis I on the base 201, an arm 203 pivotally mounted on the turret 202 about a horizontal axis II, another arm 204 pivotally mounted on the arm 203 about an axis III parallel to the axis II, and a robot wrist structure 205 which is rotatably mounted about the axis IV of the arm 204 and about two further mutually orthogonal axes V and VI. The movement of the aforesaid robot elements about the six axes I, II, III, IV, V and VI is controlled by respective electric drive motors M1, M2, M3, M4, M5 and M6 associated with the robot structure.

The robot according to the example is of the type wherein the electronic drive devices associated with the various electric motors M1-M6 are distributed on the robot structure and are each directly mounted on the body of the respective electric motor. All electronic drive devices are then connected to an electronic central processing unit (CPU) 5, arranged in the cabinet 3.

Figure 2:
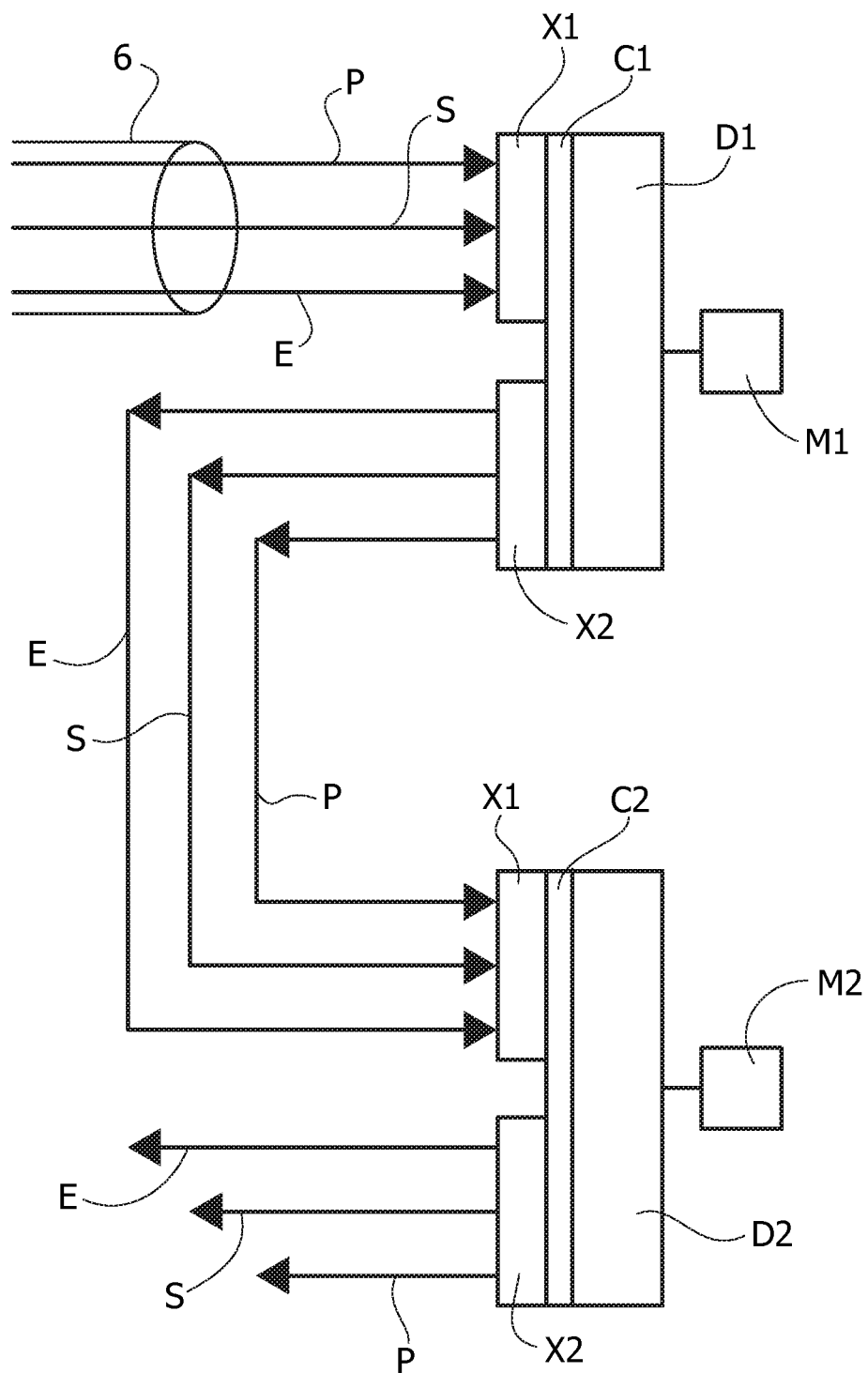
FIG. 2 is a diagram illustrating the connection between the electronic drive devices associated with the electric robot motors.

As seen in FIG. 2, the electronic drive devices associated with the motors M1, M2 . . . , M6 are respectively designated by D1, D2, . . . D6. The various electronic drive devices D1-D6 are connected between each other and to the central processing unit 5 in series. Therefore, each of the electronic drive devices D1-D6 is provided with a connector unit including a first connector X1 and a second connector X2. The central processing unit 5 is connected, via a single cable 6, to a first drive device D1 which is then in turn connected in series to the other electronic drive devices. The connecting cable 6 between the central unit 5 and the first drive device D1, as well as each of the cables that connect two successive drive devices includes, in the case of the illustrated example, a power line P, a signal line S and an Ethernet communication line E. As already indicated, the Ethernet line may be an EtherCat, Powerlink real time Ethernet line, or similar.

Figure 3:
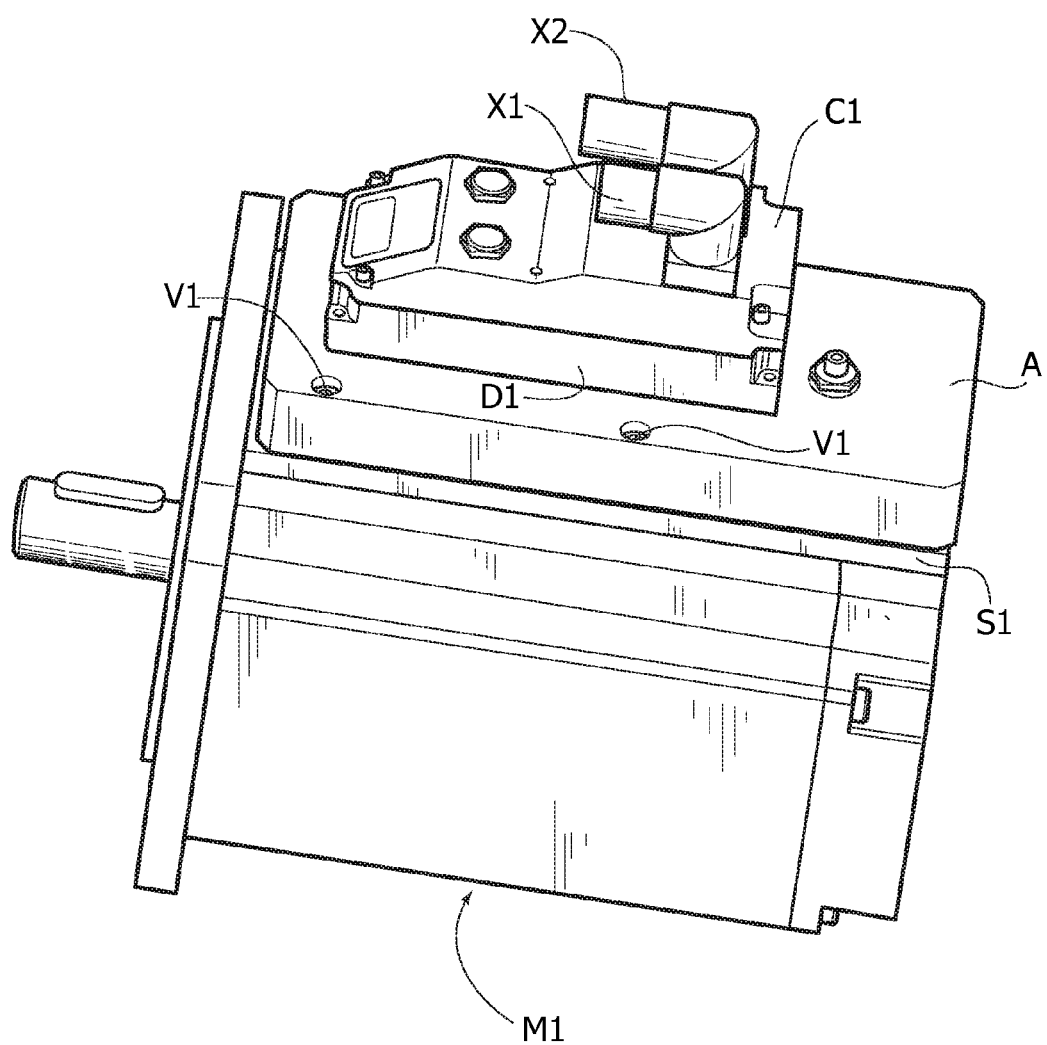
FIG. 3 is an enlarged scale prospective view of one of the electric robot motors with the unit above it that includes the adapter plate, the electronic drive device and the connector unit.

FIG. 3 shows in detail on an enlarged scale the electric motor M1 having a body on which the electronic device D1 is directly secured. In FIG. 3, only the outer casing of the device D1 is visible, in the form of a flattened box. The internal parts and configuration of this casing can be provided according to the skill in the art.

Figure 5:
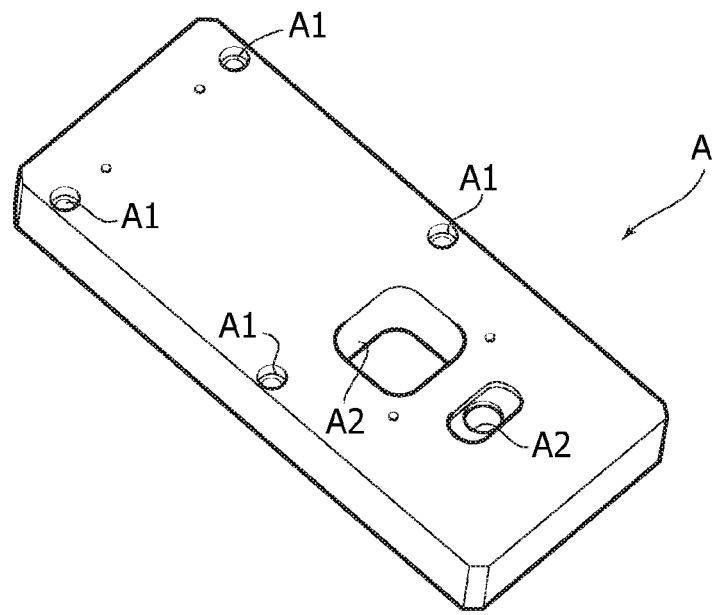
FIGS. 5 and 6 are two perspective views of the adapter plate.
Figure 6:
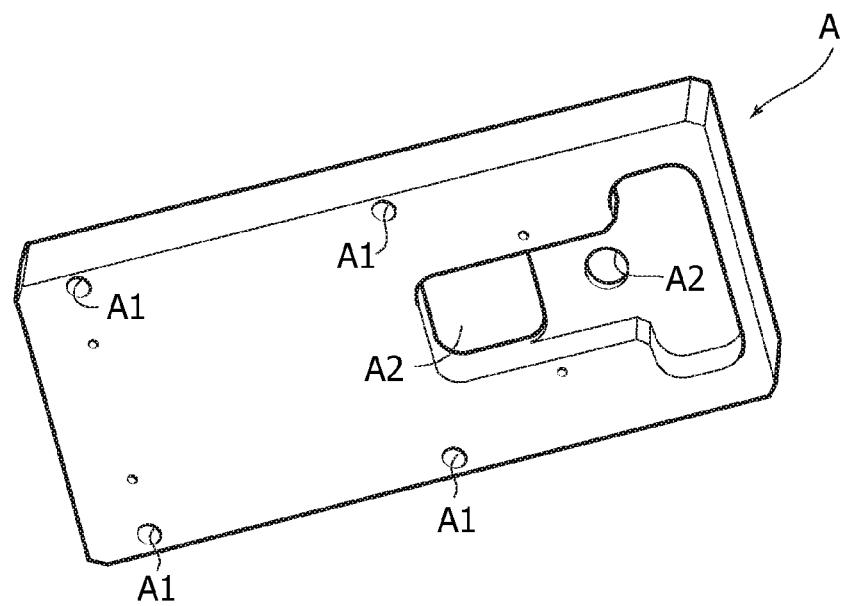

As shown, the electronic drive device D1 is mounted above the body of the electric motor M1 with the interposition of an adapter plate A of metal material, which is attached to the motor by means of screws V1. The structure of the adapter plate A is visible in FIGS. 5, 6, and has holes A1 for the passage of screws for fastening to the motor body, and openings A2 for the passage of the connections between the electronic drive device and the electric motor. As already indicated above, the adapter plate may also be made up of a portion of the body of the drive device, formed together as a single piece.

Figure 4:
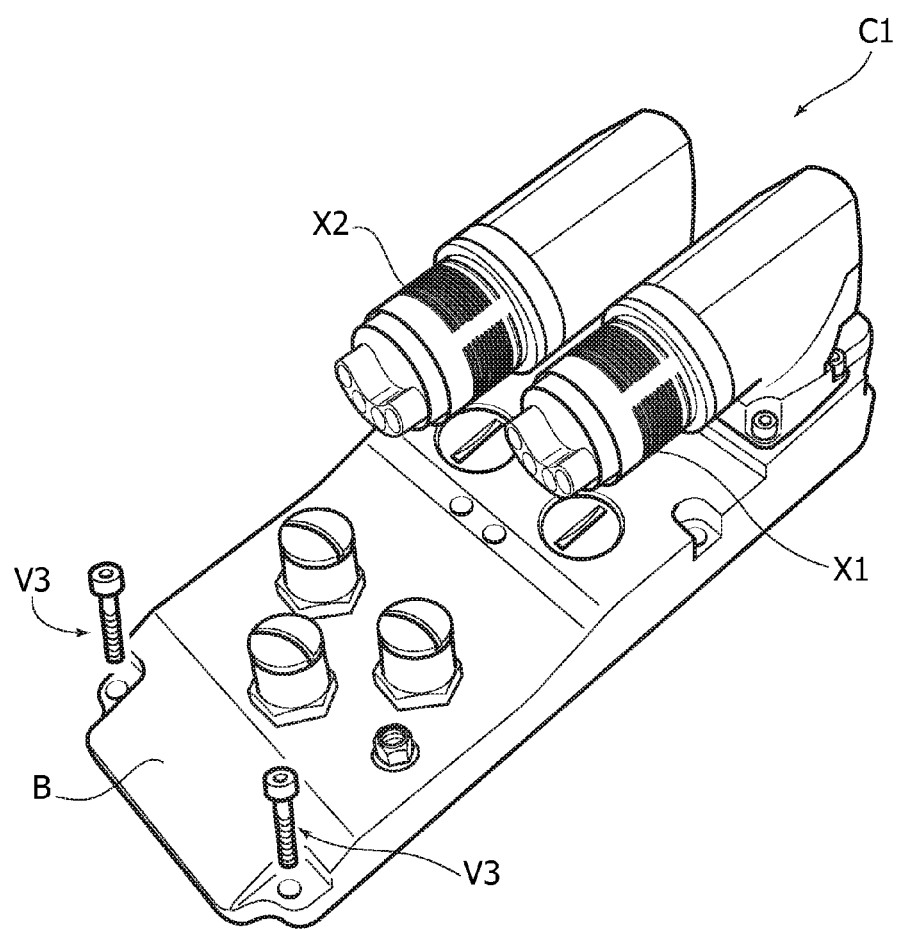
FIG. 4 is a perspective view on an enlarged scale of just the connector unit.

FIG. 4 shows the detail of the connector unit in a perspective view, the connector unit being generally designated by reference C1, and including the two connectors X1 and X2 mounted on a base B provided with screws V3 for fastening onto the casing of the drive device.

Again with reference to FIG. 3, as indicated above a layer S1 of thermally insulating material, for example PTFE, may be interposed between the adapter plate A and the body of the electric motor.

As already discussed above, due to the provision of the series connection of the electronic drive devices distributed on the robot structure, and the Ethernet communication line, on one hand an efficient control of the robot motors is enabled and, on the other hand, the robot harness, the connection harness between the robot structure and the control cabinet, and the associated connectors arranged at the base of the robot are all dramatically simplified. The arrangement of a simpler and less bulky harness within the robot enables a very simplified arrangement of the harness in a way that reduces the bending and torsion deformations to which the harness itself is subject during the use of the robot, which provides an increase in the service life of the harness. Moreover, the simplification of the harness ensures the possibility of replacing the harness with simple and quick operations. The connectors arranged at the base of the robot for connection to the control cabinet are also drastically simplified.

Naturally, without prejudice to the principles described above, the details of construction and the embodiments may widely vary with respect to those described and illustrated purely by way of example, without thereby departing from the scope of the present invention.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An industrial robot, comprising:
   a robot structure comprising a plurality of robot elements movable relative to each other and a plurality of actuating means, the plurality of actuating means each for driving the movement of a respective robot element, wherein each of the actuating means associated with a respective robot element comprises at least one electric drive motor; and
   electronic means for the electrical supply and control of the robot structure, the electronic means comprising a central electronic processing unit located at a remote position from the robot structure and a plurality of electronic drive devices, the plurality of electronic drive devices each for the electric power supply and control of the electric motor associated with each respective robot element, with the electronic drive devices being connected to the central electronic processing unit, wherein:
   the electronic drive devices are distributed on the robot structure, each adjacent to the respective electric motor,
   the electronic central processing unit is only connected to the first of the aforesaid electronic drive devices distributed on the robot structure, the other electronic drive devices being connected in series to the first electronic drive device, each electronic drive device is rigidly connected to the body of the respective electric motor with the interposition of an adapter plate, a connector unit is mounted on top of each electronic drive device including a first electrical connector and a second electrical connector for the aforesaid series connection of the electronic drive device between the central electronic processing unit and the other electronic drive devices, and the first and second electrical connector include connecting elements for an Ethernet line, which connects together the electronic drive devices and the central processing unit.

2. The robot according to claim 1, wherein the series connection of the electronic drive devices with the central electronic processing unit comprises a power line, a signal line and the Ethernet line.

3. The robot according to claim 1, wherein the first and second electrical connectors are part of a connector unit comprising a base provided with screws for fastening onto the casing of the respective electronic drive device, the first and second connectors having their bodies mounted above the base.

4. The robot according to claim 3, wherein the adapter plate is of metal material, is provided with holes for the engagement of screws for fastening onto the body of the respective electric motor and has passages for the connections between the electronic drive device and the respective electric motor.

5. The robot according to claim 4, wherein a layer of thermally insulating material is interposed between the adapter plate and the body of the respective electric motor.

* * * * *